US011181613B2

(12) United States Patent
Izadian

(10) Patent No.: US 11,181,613 B2
(45) Date of Patent: Nov. 23, 2021

(54) FILTERING UNDESIRED POLARIZATION OF SIGNALS TRANSMITTED FROM A CHIP TO A WAVEGUIDE UNIT

(71) Applicant: Waymo LLC, Mountain View, CA (US)

(72) Inventor: Jamal Izadian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 400 days.

(21) Appl. No.: 16/216,598

(22) Filed: Dec. 11, 2018

(65) Prior Publication Data

US 2020/0182963 A1 Jun. 11, 2020

(51) Int. Cl.
*G01S 7/02* (2006.01)
*H01Q 21/24* (2006.01)
*H01Q 1/36* (2006.01)
*H01Q 21/00* (2006.01)
*G01S 13/91* (2006.01)
*G01S 19/42* (2010.01)

(52) U.S. Cl.
CPC .............. *G01S 7/024* (2013.01); *G01S 13/91* (2013.01); *G01S 19/42* (2013.01); *H01Q 1/36* (2013.01); *H01Q 21/005* (2013.01); *H01Q 21/24* (2013.01)

(58) Field of Classification Search
CPC .......... G01S 7/024; G01S 13/91; G01S 19/42; H01Q 1/36; H01Q 21/005; H01Q 21/24
See application file for complete search history.

(56) References Cited

U.S. PATENT DOCUMENTS

| 8,786,385 | B1 | 7/2014 | Lorenc |
| 9,806,431 | B1* | 10/2017 | Izadian ................. H01Q 13/10 |
| 2007/0035462 | A1 | 2/2007 | Hertel |
| 2012/0235882 | A1 | 9/2012 | Iverson et al. |
| 2014/0009249 | A1 | 1/2014 | Park |
| 2017/0098892 | A1* | 4/2017 | Kim .................... H01Q 21/064 |
| 2017/0215210 | A1* | 7/2017 | Lipowski .......... H04W 72/0453 |
| 2018/0342797 | A1 | 11/2018 | Pan et al. |
| 2021/0021048 | A1* | 1/2021 | Da Silveira ............ H01Q 5/335 |

OTHER PUBLICATIONS

International Search Report and Written Opinion dated Apr. 9, 2020, issued in connection with International Application No. PCT/US2019/065234, filed on Dec. 9, 2019.

* cited by examiner

Primary Examiner — Donald HB Braswell
(74) Attorney, Agent, or Firm — McDonnell Boehnen Hulbert & Berghoff LLP

(57) ABSTRACT

A communication system is disclosed. The system may include an antenna unit having a port. The system may also include a communication chip communicably coupled to the antenna unit and having an antenna configured to transmit electromagnetic signals into the port. In addition, the system may include a slotted structure configured for receiving the electromagnetic signals from the antenna and coupling the electromagnetic signals from the antenna into the port.

20 Claims, 13 Drawing Sheets

FILTERING UNDESIRED POLARIZATION OF SIGNALS TRANSMITTED FROM A CHIP TO A WAVEGUIDE UNIT

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

One such system is a radar system for a vehicle. A radar system can be used to sense objects in an environment of the vehicle. For example, the radar system may measure the distance between the vehicle and various object in the environment of vehicle.

Vehicle systems such as a radar system and other devices/sensors may transmit and receive numerous signals that facilitate vehicle operation. Thus, it is desirable for such signals to be communicated reliably between components within a particular system or between systems.

SUMMARY

Disclosed are devices that may be used for the communication of signals between various components of the vehicle. For example, an antenna unit may be mounted on the roof of the vehicle, such as in a sensor dome. The antenna unit may be part of a radar system of the vehicle or another system. During operation of the radar system, for instance, a communication chip antenna may radiate signals into a port of the antenna unit. The signals may then be coupled from the port to one or more transmission antennas, which in turn may radiate the signals to sense objects in the environment of the vehicle. To help improve the quality of the signals radiated by the antenna unit, a slotted, signal-filtering structure can be used to filter out undesired polarization from the signals output by the communication chip.

Some embodiments of the present disclosure provide a communication system. The communication system includes an antenna unit having a port. The communication system also includes a communication chip communicably coupled to the antenna unit and having an antenna configured to transmit electromagnetic signals into the port. Further, the communication system includes a slotted structure configured for receiving the electromagnetic signals from the antenna and coupling the electromagnetic signals from the antenna into the port.

Some embodiments of the present disclosure provide a method for filtering out undesired polarizations from electromagnetic signals. The method includes coupling, from a communication chip, into a slotted structure, electromagnetic signals transmitted by an antenna of the communication chip, where the antenna is configured to transmit the electromagnetic signals out of the communication chip and toward a port of an antenna unit, where the antenna unit is communicatively coupled to the communication chip, where the electromagnetic signals transmitted by the antenna have a desired polarization and an undesired polarization, and where the slotted structure is configured to couple electromagnetic signals having the desired polarization into the antenna unit. The method also includes coupling, from the slotted structure, into the port of the antenna unit, the electromagnetic signals having the desired polarization, whereby the undesired polarization is removed and the electromagnetic signals leaving the slotted structure have the desired polarization.

Some embodiments of the present disclosure provide another communication system. The communication system includes an antenna unit configured to radiate radar signals. The antenna unit includes a plurality of transmission antennas arranged in an array a port configured to receive radar signals for radiation by the plurality of transmission antennas, and a waveguide network coupling the port to the plurality of transmission antennas. The communication system also includes a communication chip communicably coupled to the port, where the communication chip is configured to radiate a radar signal having a desired polarization and an undesired polarization. Further, the communication system includes a signal-filtering structure configured to filter the undesired polarization from the radar signal.

These as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
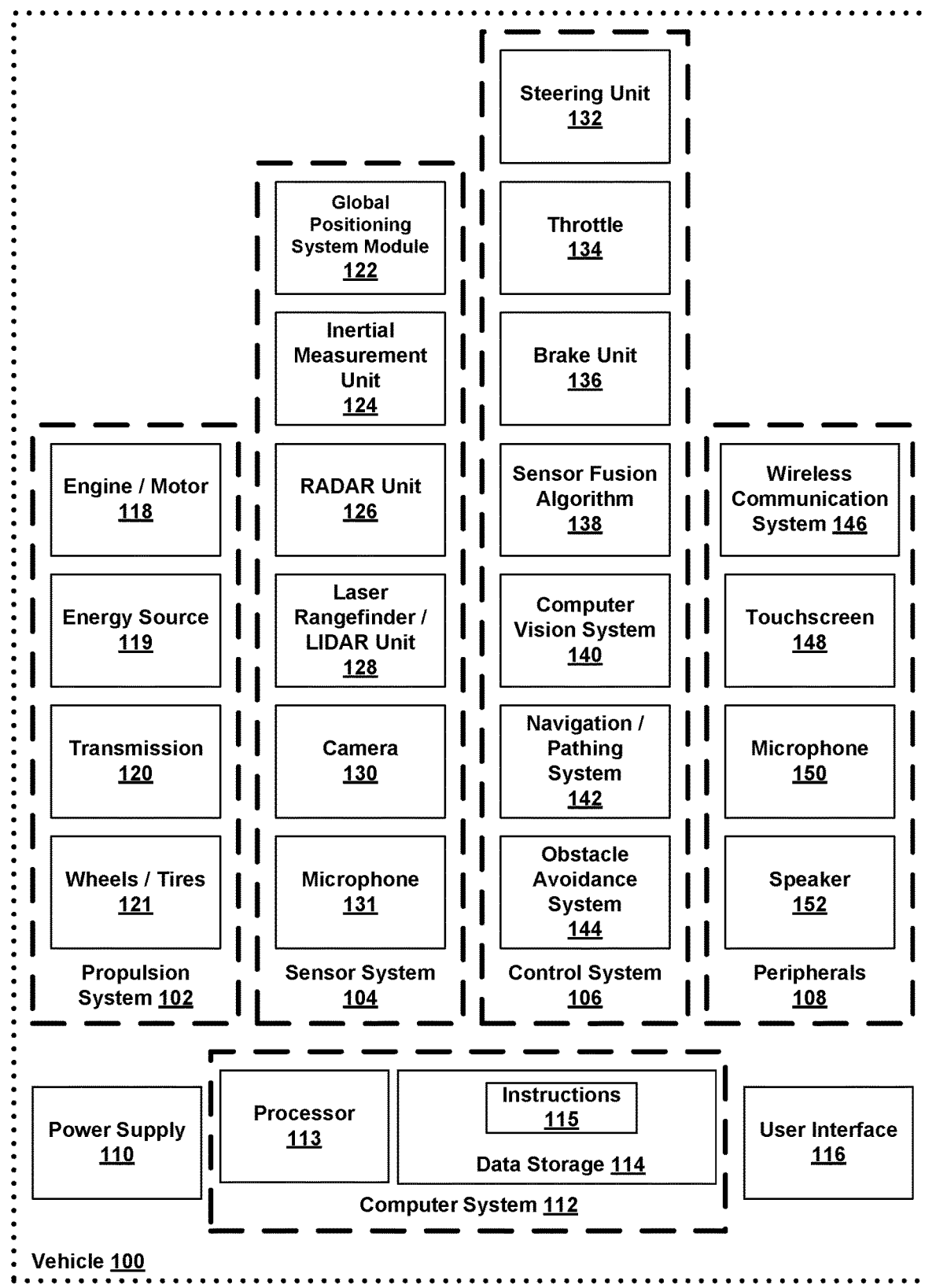
FIG. 1 is a functional block diagram depicting aspects of an example autonomous vehicle.

An example radar system of a vehicle may include a signal processing subsystem, an antenna subsystem, and a communication chip (e.g., a microchip). During the operation of a radar system, an antenna of the communication chip may transmit (i.e., radiate) electromagnetic signals—namely, radio (or microwave) frequency radar signals—to the antenna subsystem, which in turn transmits the radar signals into the environment of the vehicle. The antenna subsystem or other subsystem of the radar system may then receive reflections of the radar signals that the antenna subsystem transmitted. The signal processing subsystem may then process the received signals to determine information about objects in the environment of the vehicle.

Signals radiated by an antenna typically have a desired polarization that is in accordance with a design of the antenna. For instance, signals radiated by a vertically-aligned antenna may have vertical polarization, and signals radiated by a horizontally-aligned antenna may have horizontal polarization. However, in addition to the desired polarization, the radiated signals may have an undesired polarization (also referred to as a "cross polarization") in directions other than the desired polarization, such as orthogonal, to the direction of radiation. For instance, if the antenna is designed to radiate signals having a vertical polarization, the undesired polarization may be horizontal polarization.

In the context of a vehicle's radar system, the presence of cross polarization may cause the radar system to perform less efficiently than desired. For instance, a radar system may be configured to transmit signals with a first set of antennas with a first polarization and transmit signals with a second set of antennas with a second polarization, orthogonal to the first polarization. If one of the two sets of antennas is transmitting a signal that contains cross polarization, it may interfere with the signal transmitted by the other set of antennas.

Thus, disclosed is a communication system having a slotted structure (also referred to herein as a "signal-filtering structure") configured to filter out an undesired polarization from signals transmitted by a communication chip and couple the signals into a port of the antenna subsystem. Although the disclosed communication system is described herein primarily with respect to a radar system and radar signals, it should be understood that the disclosed communication system could also be implemented in other vehicle systems, such as LIDAR or other systems having sensors that facilitate operation of the vehicle, and could be configured for communication of non-radar electromagnetic signals.

Within examples, the communication system may include various components of a radar system. For instance, the communication system may include an antenna unit. The antenna unit may include a port into which electromagnetic signals are received. The antenna unit may also include at least one transmission antenna for radiating electromagnetic signals from the vehicle. The communication system may also include a communication chip having an antenna. The communication chip may be communicably coupled to the port. Signals transmitted by the communication chip may be coupled directly from the chip into the port in some examples, or may be coupled through an intermediate waveguide before entering the port, such as an elongated, waveguide chimney, in other examples. Further, in examples where no intermediate waveguide is present, the communication chip may be physically attached to the port of the antenna unit or there may be an air gap between the chip and the port.

In addition, the communication system may include a slotted structure. The slotted structure can be integrated with a housing of the communication chip (i.e., printed on top of the chip, or integrated within a layer of the chip), or included as a component that is physically distinct and separate from the chip and that is coupled between the chip and the antenna unit (e.g., coupled to the port or coupled to, but still a separate component from, the chip).

During operation of the communication system, the communication chip creates an electromagnetic signal for ultimate transmission by antennas of the antenna unit. The antenna of the communication chip may transmit the electromagnetic signal outside of the communication chip. The slotted structure may receive the electromagnetic signal. The electromagnetic signal may pass through the slotted structure, whereby any undesired polarization is filtered out from the electromagnetic signal. The slotted structure may then couple them electromagnetic signal into the port. Thus, the disclosed communication system can reduce signal interference typically caused by cross polarization. Further, the disclosed communication system can enable electromagnetic energy to be harvested from the communication chip.

An example autonomous vehicle is described below in connection with FIGS. 1-2, while example communication systems are described below in connection with FIGS. 3-9.

II. Example Autonomous Vehicle System

In example embodiments, an example autonomous vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Example systems within the scope of the present disclosure will be described in greater detail below. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a radar unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The radar unit 126 can represent a system that utilizes radio signals to sense objects within the local environment of the vehicle 100. In some embodiments, in addition to sensing the objects, the radar unit 126 and/or the computer system 112 can additionally be configured to sense the speed and/or heading of the objects. The radar unit 126 may include any antenna(s), waveguide networks, communication chip(s), and/or other components that may facilitate radar operation.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
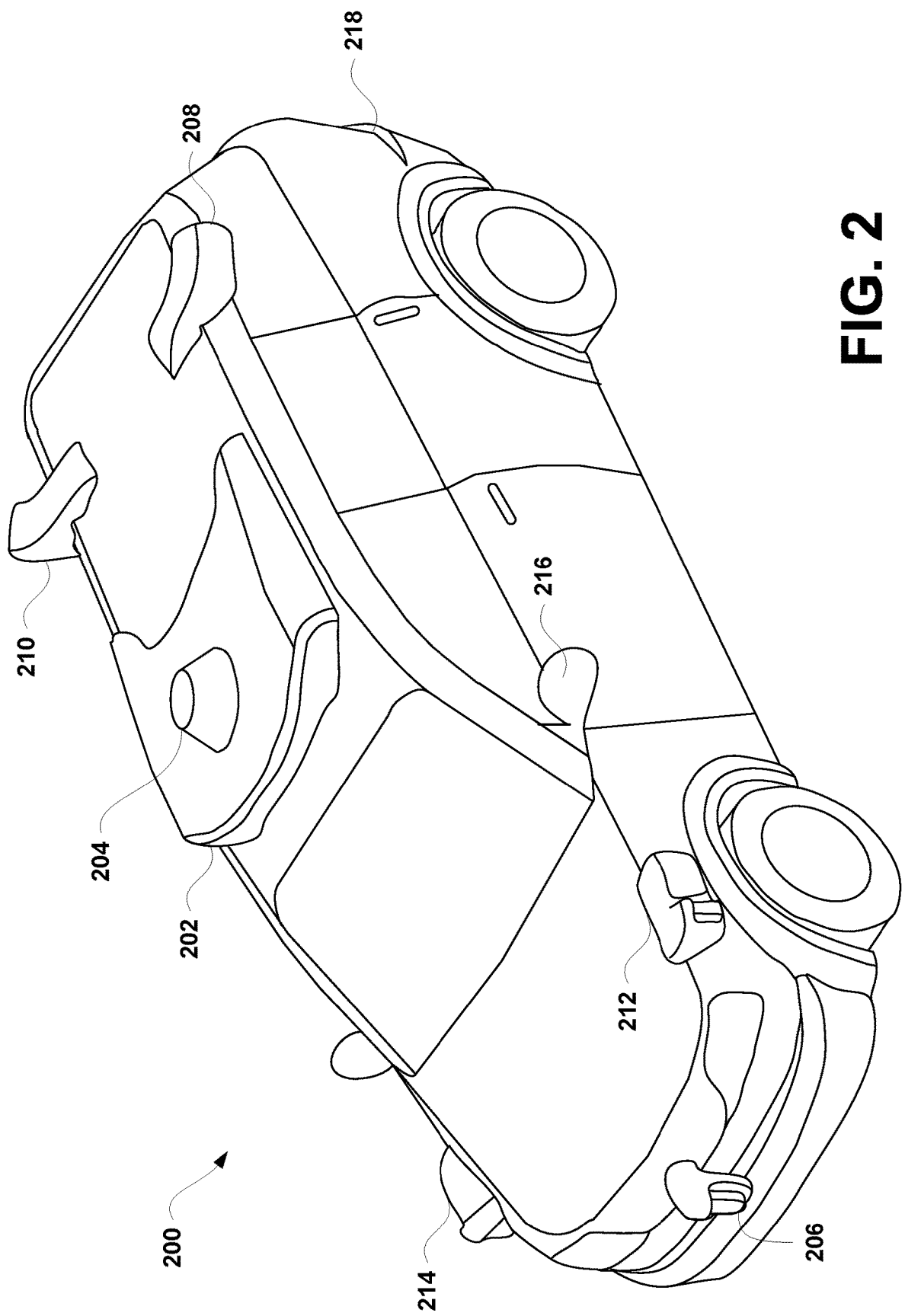
FIG. 2 depicts an exterior view of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the region in back of the car 200 for the presence of radio-reflective objects. Similarly, the first LIDAR/radar unit 212 and the second LIDAR/radar unit 214 may be mounted near the front of the vehicle to actively scan a region in front of the vehicle. A radar scanner can be situated, for example, in a location suitable to illuminate a region including a forward-moving path of the vehicle 200 without occlusion by other features of the vehicle 200. For example, a radar scanner can be situated to be embedded and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

III. Example Communication System

An example communication system will now be described in more detail. At a minimum, the example communication system may include an antenna unit, a communication chip, and a slotted structure.

Figure 3:
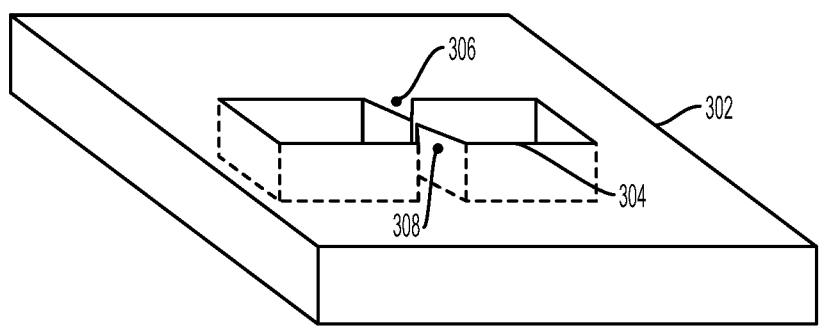
FIG. 3 illustrates a perspective view of an example slotted structure.

FIG. 3 illustrates a perspective view of an example slotted structure 302 that is configured for receiving signals from an antenna of a communication chip and [and] coupling the signals from the antenna into a port of the antenna unit. The slotted structure 302 may be comprised of a metal substrate. As shown, the slotted structure 302 includes a slot 304 through which signals may pass. The slot 304 may be substantially rectangular in shape. As shown in FIG. 3, the slot 304 has a rectangular-bowtie shape. The rectangular-bowtie shape may be chosen based on impedance matching characteristics. To match impedance, the size and shape of the rectangular bowtie may be adjusted. The width of the rectangular portion and the angle and length of the slanted center portion of the bowtie may be adjusted based on desired impedance characteristics. The slanted portion of the slot 304 may also be designed to increase coupling between the antenna of the communication chip and the slot 304. In some other examples, the slot 304 may be a rectangle without the slanted portions. Although the slot 304 is shown as a rectangle with sharp corners, in practice, the slot 304 may be a rectangle as shown, or a shape that is generally rectangular. For example, some manufacturing processes may produce a rectangular shape with more rounded corners. Further, in some examples, the slot 304 may be a shape other than rectangular and still providing the polarization filtering as described.

The slot 304 may radiate a linearly-polarized signal aligned in the directed of the longest dimension of the slot 304. The slotted structure 300 may also two vias 306, 308. In other examples, a slotted structure may include more than two vias or less than two vias. Each of the two vias 306, 308 may be configured to excite the slot 304 and/or ground the slotted structure 302. The slot 304 may be excited in different ways depending on various examples. The slot may electrically (or magnetically) couple to the antenna of the communication chip when the antenna radiates a signal. In other examples, the vias may couple directly to RF contact points on the chip. The RF contact points may provide signals that induce an electric field in the slot 304, which may in turn cause the slot 304 to radiate. Although the two vias 306, 308 are shown toward the center of the slot 304, the vias may be located in other positions as well. The locations of vias may be any location where the vias may induce the slot 304 to radiate electromagnetic energy.

As discussed above, the slotted structure 302 can be integrated with a housing of a communication chip (e.g., printed on top of the chip, or integrated within a layer of the chip), coupled to a port of an antenna unit, or coupled on top of (and as a physically distinct and separate component from) the communication chip.

Figure 4A:
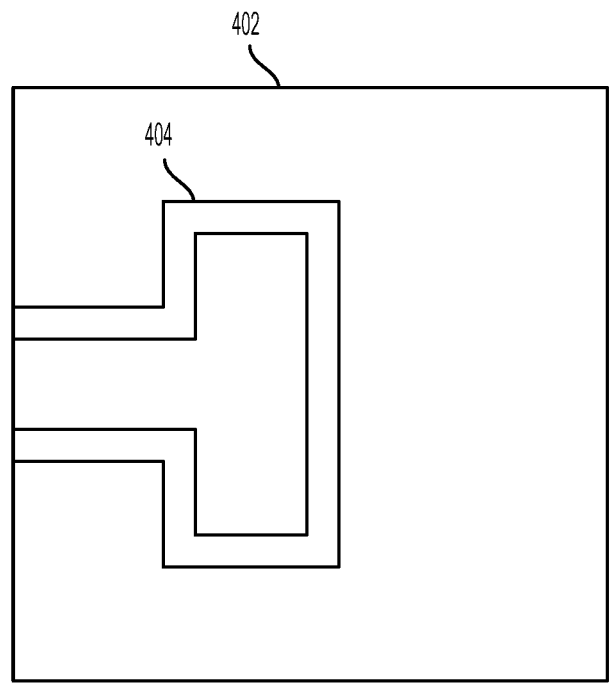
FIG. 4A illustrates an example microchip having an antenna.

FIG. 4A illustrates an example microchip 402 having an antenna 404. The antenna 404 may be used by the microchip 402 to communicate signals out of and into the microchip 402. Often, and especially at radio frequencies, the interface to and from a microchip may be inefficient and or difficult to design. Therefore, to improve chip communications, microchips may include antennas that can communicate signals to components external to the microchip.

Figure 4B:
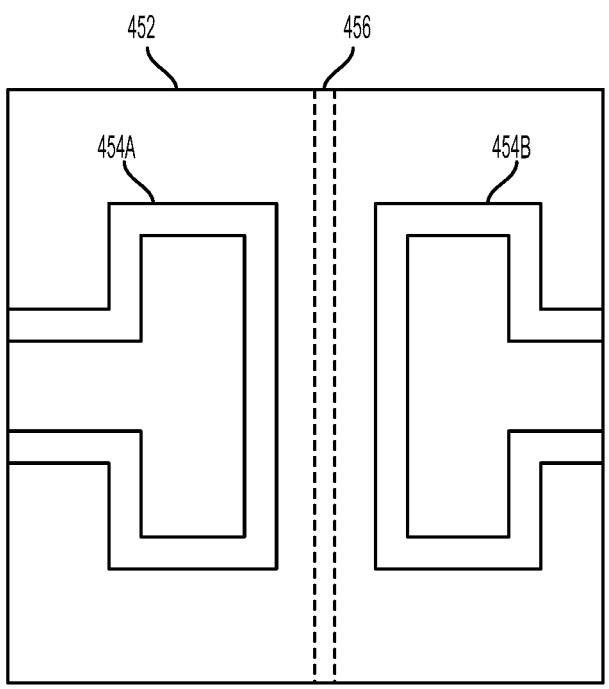
FIG. 4B illustrates an example microchip having two antennas.

FIG. 4B illustrates an example microchip 452 having two antennas 454A and 454B. The example microchip 452 also includes a grounding portion 456 locate between the two antennas 454A and 454B. Microchip 452 may include two (or more) antennas, each of which functions in a similar manner to the antennas of microchip 402. Each antenna of microchip 452 may be coupled to a respective interface waveguide (e.g., shown in FIG. 7B and described below). In addition, microchip 452 may have a grounding portion 456. The grounding portion 456 may couple to grounded portions (not shown) of other elements in the RF pathway to provide a common ground. In some examples where an intermediate waveguide, such as a waveguide chimney (e.g., shown in FIGS. 7A-7B and described below) having (or not having) a rotary joint, is present between the microchip 452 and the port of the antenna unit, the grounding portion 456 may be coupled to the intermediate waveguide. By grounding the grounding portion 456 to the intermediate waveguide, the two antennas 454A and 454B may be sufficiently isolated from each other. When the two antennas 454A and 454B are isolated from each other, each antenna might not receive (or receive a small portion of) signals communicated to or from the other respective antenna.

Figure 5:
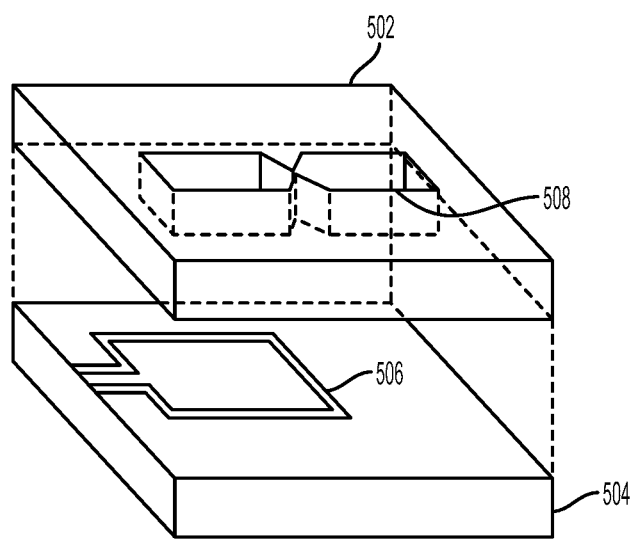
FIG. 5 illustrates an exploded view including an example slotted structure and a microchip.

FIG. 5 illustrates an exploded view including an example slotted structure 502 and a microchip 504. More particularly, FIG. 5 illustrates an exploded view of how the slotted structure 502 may be assembled with the microchip 504. Arranged in this way, signals transmitted by an antenna 506 of the microchip 504 would pass through a slot 508 in the slotted structure 502, whereby an undesirable polarization would be filtered from the signals, thus leaving only a desired polarization. Although the slotted structure 502 and the microchip 504 are illustrated as separate layers in FIG. 5, it should be understood that the slotted structure 502 could be (i) printed onto the microchip 504, and thus integrated with the microchip 504, or (ii) a physically distinct and separate component from the microchip 504 and coupled on top of the microchip 504.

As discussed above, in an example communication system, a slotted structure may couple transmitted signals from an antenna of a communication chip into a port of an antenna unit. In some embodiments, the signals may be coupled directly from the communication chip, through the slotted structure, and into the port, without propagating through an intermediate waveguide structure located between the chip and the port.

Figure 6A:
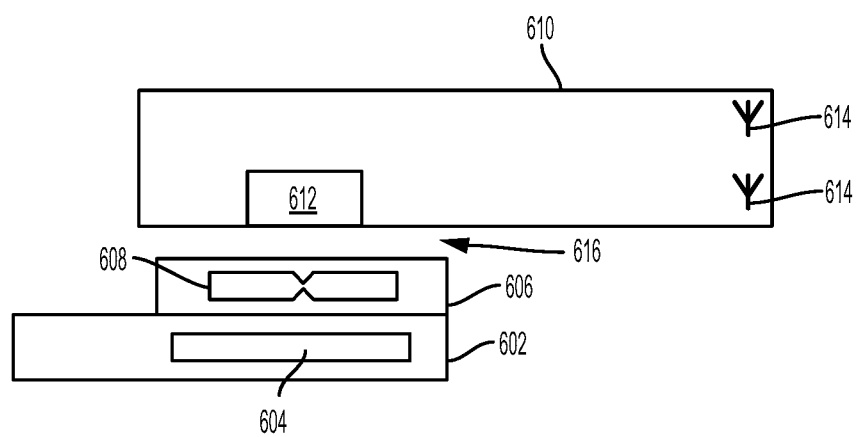
FIG. 6A illustrates an example communication system.
Figure 6B:
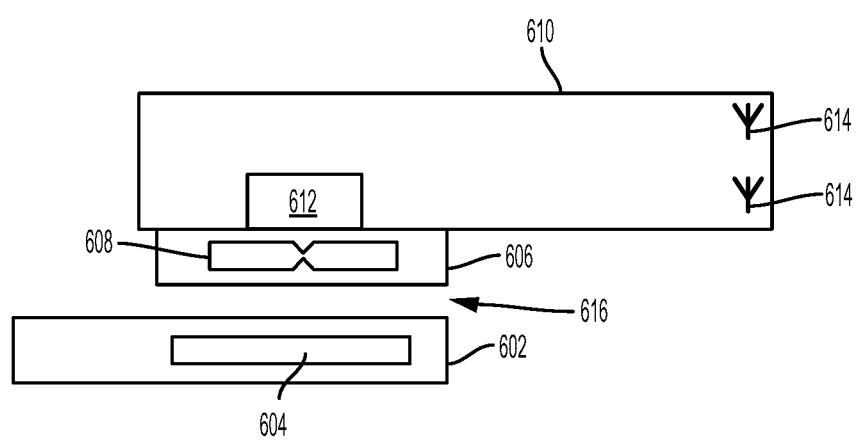
FIG. 6B illustrates another example communication system.

FIG. 6A and FIG. 6B each illustrate an example communication system in which no intermediate waveguide structure is present. As shown, each communication system includes (i) a communication chip 602 having an antenna 604, (ii) a slotted structure 606 having a slot 608, and (iii) an antenna unit 610. The antenna unit 610 may include two surfaces. At a first surface of the two surfaces, the antenna unit 610 may include a port 612 configured to receive signals. At a second surface of the two surfaces, the antenna unit 610 may include at least one radar-transmission antennas configured to radiate the signals received into the port 612. As a representative example, two radar-transmission antennas 614 are shown, although in other embodiments, more or less radar-transmission antennas are possible. In some examples, the antenna unit 610 may include a plurality of radar-transmission antennas arranged in an array. Further, in some examples, the antenna unit 610 may include a waveguide network (not shown) that couples the port 612 to the radar-transmission antenna(s). Signals received into the port 612 may thus propagate through the waveguide network to be radiated by the radar-transmission antenna(s).

As shown in FIG. 6A, the slotted structure 606 may be coupled to the communication chip 602. Further, as shown in FIG. 6B, the slotted structure 606 may be coupled to the port 612. Although the slotted structure 606 is illustrated as a separate component from the communication chip 602 in the embodiments shown in FIG. 6A and FIG. 6B, the slotted structure 606 may be integrated with the housing of the communication chip 602 in other embodiments.

The communication chip 602 may be communicably coupled to the antenna unit 610. That is, the communication chip 602 and the antenna unit 610 may be coupled such that signals can propagate between the communication chip 602 and the antenna unit 610. The communication chip 602 and the antenna unit 610 may be physically coupled (i.e., contact each other) in some embodiments. In other embodiments, the communication chip 602 and the antenna unit 610 may not be physically coupled, but may still be considered to be communicably coupled.

In some cases, it may be desirable to communicably couple the communication chip 602 and the antenna unit 610 in a manner that allows for rotation of the antenna unit 610. For example, this may occur in an embodiment in which the communication chip is coupled to the vehicle and resides "vehicle-side," and the antenna unit 610 resides "antenna-side" in a sensor unit that is rotatably mounted to the vehicle and configured to rotate (e.g., 360°) about a vertical axis. During operation of the communication system in this example, the vehicle-side communication chip may transmit signals to and/or receive signals from the antenna-side antenna unit.

To facilitate this, the communication chip 602 and the antenna unit 610 may be communicably coupled by way of a rotary joint 616. Herein, a "rotary joint" may refer to a mechanism (or lack thereof) that enables one component to rotate with respect to another component, and also enables electromagnetic energy to propagate between the two components without resulting in any undesirable loss. In essence, the rotary joint electrically couples the communication chip 602 to the antenna unit 610 (or, more particularly, to the port 612 of the antenna unit 610).

The rotary joint 616 may take various forms. In some examples, such as the examples shown in FIG. 6A and FIG. 6B, a rotary joint 616 may take the form of an air gap between the communication chip 602 and the antenna unit 610. In such examples, the communication chip 602 may be mounted to the vehicle while the antenna unit 610 may be mounted to the sensor unit. Thus, when the sensor unit is mounted the vehicle, the communication chip 602 and the port 612 of the antenna unit 610 may be brought proximate to each other, forming the air gap. The air gap may be approximately 1-3 mm, or may be outside of that range. During the operation of the waveguide system, vibrations and the rotation of the sensor units may cause the spacing of the air gap and the alignment of the communication chip 602 and the port 612 to change. In such a system, the coupling through the rotary joint uses an air-filled waveguide and the components of the system are tuned to maximize coupling while making the coupling functionally independent or insensitive to gaps variations and rotations.

In other examples, the rotary joint may include a physical connection (not shown) between opposite waveguide sections. The physical connection may be an abutment of the respective ends of the waveguide sections. Further, in these or other examples, the rotary joint may include other components as well. For example, the rotary joint may include some additional components, such as a bearing sleeve, slip ring, or similar structure, that help align the opposite waveguide sections while allowing for rotation.

During operation of the communication systems shown in FIG. 6A and FIG. 6B, the antenna 604 may generate electromagnetic signals having a desired polarization and an undesired polarization. The electromagnetic signals may propagate through the slot 608, thereby causing the undesired polarization to be filtered. The electromagnetic signals, now having the desired polarization, may then propagate into the port 612. The electromagnetic signals may then propagate through a waveguide network (not shown) of the antenna unit 610 to be radiated by the radar-transmission antennas 614. In some examples, further polarization purification may be accomplished through use of one or more septums located in the antenna unit 610, in an intermediate waveguide, and/or elsewhere. Examples of septums and intermediate waveguides are described in more detail below.

As discussed above, an intermediate waveguide may be located between a communication chip and an antenna unit of a radar system. An example embodiment in which this may occur is an embodiment where the sensor unit is rotatably mounted to the vehicle as discussed above. Another way to facilitate communication between the communication chip and the antenna unit, the vehicle side and the sensor side may each include a respective one or more waveguide sections. Together, the vehicle-side waveguide section(s) and the antenna-side waveguide section(s) may form a single-channel or dual-channel waveguide chimney.

Figure 7A:
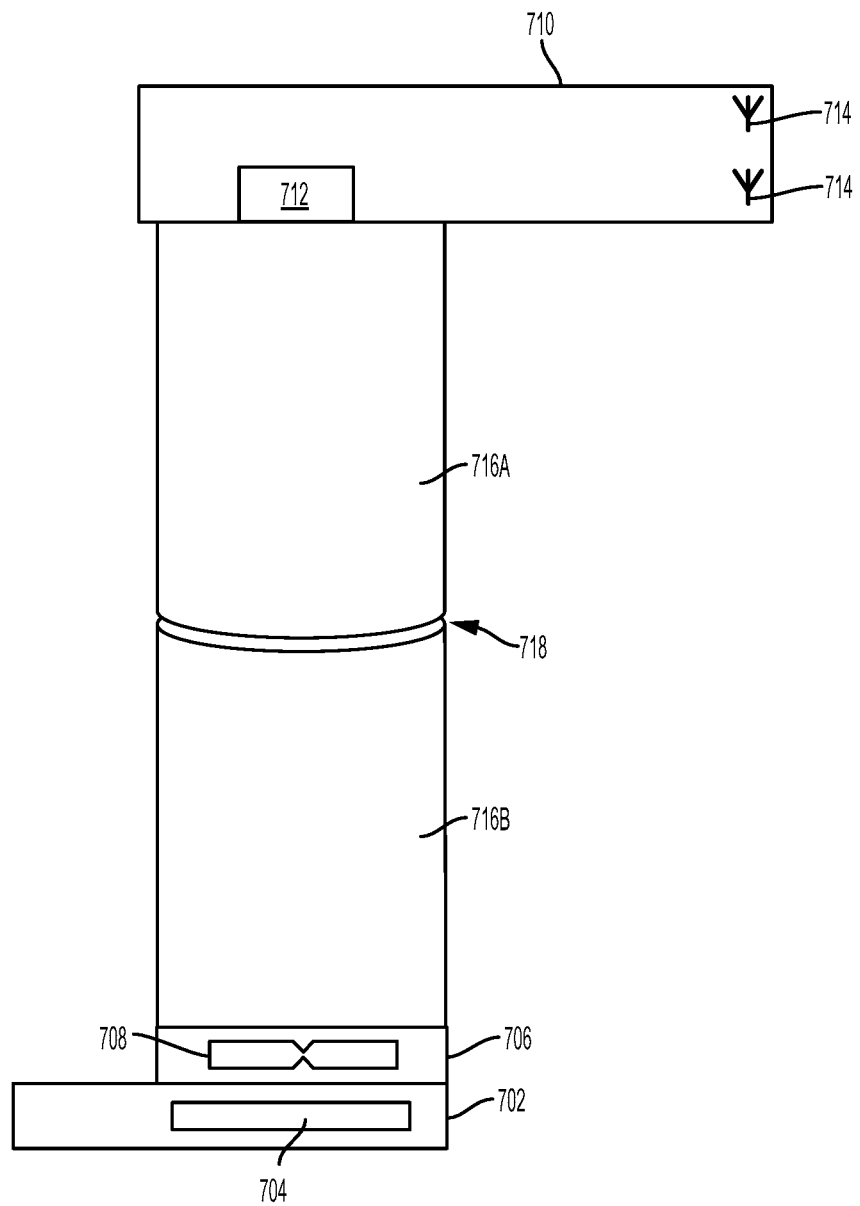
FIG. 7A illustrates another example communication system.

FIG. 7A illustrates an example communication system having a single-channel waveguide chimney. As shown, the communication system includes (i) a communication chip 702 having an antenna 704, (ii) a slotted structure 706 having a slot 708, and (iii) an antenna unit 710 having a port 712 and two radar-transmission antennas 714. In addition, the communication system includes a first waveguide section 716A and a second waveguide section 716B, that together form the single-channel waveguide chimney. The first waveguide section 716A may be coupled to the port 712. The second waveguide section 716B may be electromagnetically coupled to the communication chip 702 by way of the slotted structure 706. That is, the slotted structure 706 may be coupled between the second waveguide section 716B and the communication chip 702.

Although the slotted structure 706 is illustrated as a separate component from the communication chip 702, the slotted structure 706 may be integrated with the housing of the communication chip 702 in other embodiments. Further, although the slotted structure 706 is illustrated as being located on the vehicle-side of the communication system and coupled to the communication chip 702, the slotted structure 706 may be coupled on the antenna-side to the port 712 of the antenna unit 710 in other embodiments.

The waveguide sections 716A, 716B shown in FIG. 7A that form the waveguide chimney, and/or any other waveguide sections described herein, may be circular waveguide sections, although other types and shapes of waveguide sections are possible in other embodiments. Further, the waveguide sections 716A, 716B, and/or any other waveguide sections described herein, may be constructed of a metallic material, a non-metallic material that has been plated with a metallic surface, a dielectric material, a combination of these materials, or other materials that may have electromagnetic properties to contain and allow the propagation of electromagnetic signals.

The first waveguide section 716A and the second waveguide section 716B may be communicably coupled by way of a rotary joint 718. At the rotary joint 718, the first waveguide section 716A and the second waveguide section 716B may be approximately aligned based on the center axis of the circular portion of the waveguide. As discussed above, the rotary joint 718 can take various forms and may or might not include a physical connection (not shown) and/or other components. As shown in FIG. 7A, the rotary joint 718 is an air gap between respective ends of the waveguide sections. In this case, one waveguide section (e.g., the second waveguide section 716B) may be mounted to the vehicle while the other waveguide section (e.g., the first waveguide section 716A) may be mounted to the sensor unit. Thus, when the sensor unit is mounted the vehicle, the two portions of the waveguide may be brought proximate to each other, forming the air gap. The air gap may be approximately 1-3 mm, or may be outside of that range. During the operation of the waveguide system, vibrations and the rotation of the sensor units may cause the spacing of the air gap and the alignment of the waveguide sections to change. The example waveguide chimneys described herein allow for some movement of vehicle-side waveguide section(s) and antenna-side waveguide section(s) with respect to one another, while maintaining functionality.

During operation of the communication system shown in FIG. 7A, the antenna 704 may generate electromagnetic signals having a desired polarization and an undesired polarization. The electromagnetic signals may propagate through the slot 708, thereby causing the undesired polarization to be filtered. The electromagnetic signals, now having the desired polarization, may then propagate through the second waveguide section 716B, across the rotary joint 718, through the first waveguide section 716A, and into the port 712. The electromagnetic signals may then propagate through a waveguide network (not shown) of the antenna unit 710 to be radiated by the radar-transmission antennas 714.

Figure 7B:
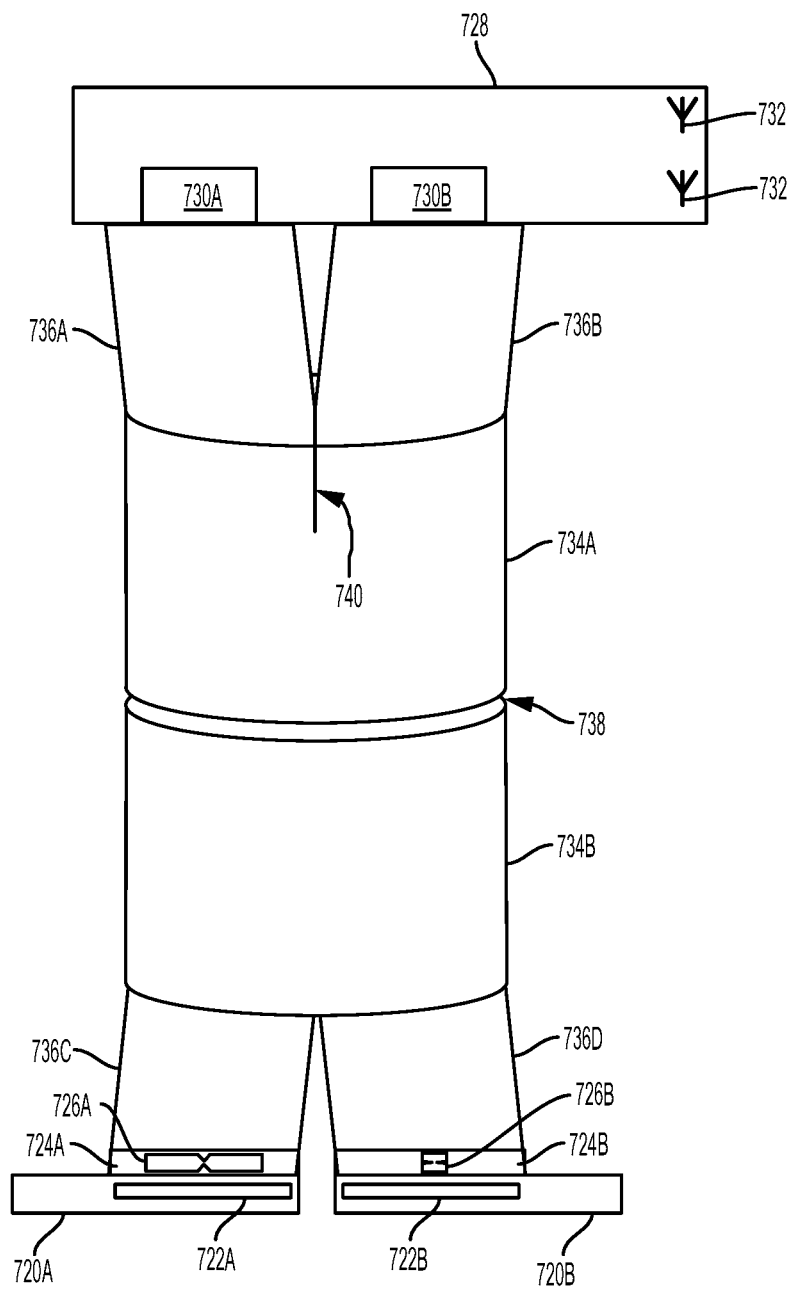
FIG. 7B illustrates another example communication system.

FIG. 7B illustrates an example communication system having a dual-channel waveguide chimney. As shown, the communication system includes (i) a first communication chip 720A having a first antenna 722A, (ii) a second communication chip 720B having a second antenna 722B, (iii) a first slotted structure 724A having a first slot 726A, (iv) a second slotted structure 724B having a second slot 726B, and (v) an antenna unit 728 having a first port 730A, a second port 730B, and two radar-transmission antennas 732. In addition, the communication system includes a first waveguide section 734A, a second waveguide section 734B, and four interface waveguides 736A, 736B, 736C, 736D, that together form the dual-channel waveguide chimney. Interface waveguide 736A may be coupled to the first port 730A, interface waveguide 736B may be coupled to the second port 730B, interface waveguide 736C may be electromagnetically coupled to the first communication chip 720A by way of the first slotted structure 724A, and interface waveguide 736D may be electromagnetically coupled to the second communication chip 720B by way of the second slotted structure 724B. In some examples, a single communication chip may have multiple antenna and therefore a single chip may be coupled to multiple interface waveguides (as shown with respect to FIG. 7C). Further, the first waveguide section 734A and the second waveguide section 734B may be communicably coupled by way of a rotary joint 738.

Although the first and second slotted structures 724A, 724B are illustrated as a separate component from the respective communication chips 720A, 720B, either structure (or both) may be integrated with the housing of the respective communication chip in other embodiments. Further, although the first and second slotted structures 724A, 724B are illustrated as being located on the vehicle-side of the communication system and coupled to their respective communication chips 720A, 720B, the first and second slotted structures 724A, 724B may be coupled on the antenna-side to the of the antenna unit 728 to the first port 730A and the second port 730B, respectively, in other embodiments.

The first waveguide section 734A may include a septum 740. The septum 740 may be aligned in a vertical manner on a plane defined by a center of where the interface waveguides 736A, 736B couple to the first waveguide section 734A. Essentially, the septum 740 may form a wall in the first waveguide section 734A between the openings of the interface waveguides 736A, 736B. An example septum configuration is shown and described in FIG. 8.

The first slot 726A may have a different orientation than the second slot 726B. As such, the first slot 726A may be configured to filter a different polarization than the second slot 726B may be configured to filter.

As so arranged, the communication system shown in FIG. 7B may in some implementations operate such that the first and second communication chips 720A, 720B may transmit electromagnetic signals to the antenna unit 728 by way of the interface waveguides 736A, 736B, 736C, 736D and the first and second waveguide sections 734A, 734B. For example, the first and second communication chips 720A, 720B may each generate an electromagnetic signal having a desired polarization and an undesired polarization. For instance, the electromagnetic signal from the first communication chip 720A may have a desired horizontal polarization and an undesired vertical polarization, and the electromagnetic signal from the second communication chip 720B may have a desired vertical polarization and an undesired horizontal polarization. The electromagnetic signal from the first communication chip 720A may be coupled by the first slotted structure 724A, through the first slot 726A (thereby filtering the vertical polarization), and into interface waveguide 736C to propagate through interface waveguide 736C. Similarly, the electromagnetic signal from the second communication chip 720B may be coupled by the second slotted structure 724B, through the second slot 726B (differently-oriented than the first slot 726A and filtering the horizontal polarization), and into interface waveguide 736D to propagate through interface waveguide 736D. Each of these interface waveguides 736C, 736D may in turn efficiently couple the respective electromagnetic signals into the second waveguide section 734B. At this point, the two electromagnetic signals may have orthogonal modes. Then, the two electromagnetic signals may propagate down the length of the second waveguide section 734B, through the rotary joint 738, and into the first waveguide section 734A to the septum 740. The two electromagnetic signals having orthogonal modes at this point may enable the septum 740 to split the electromagnetic signals, and, in turn, couple one to interface waveguide 736A, and couple the other to interface waveguide 736B. The electromagnetic signals may then propagate through the respective interface waveguides to be coupled into the first port 730A and the second port 730B, respectively, to then be radiated by the radar-transmission antennas 732.

Figure 7C:
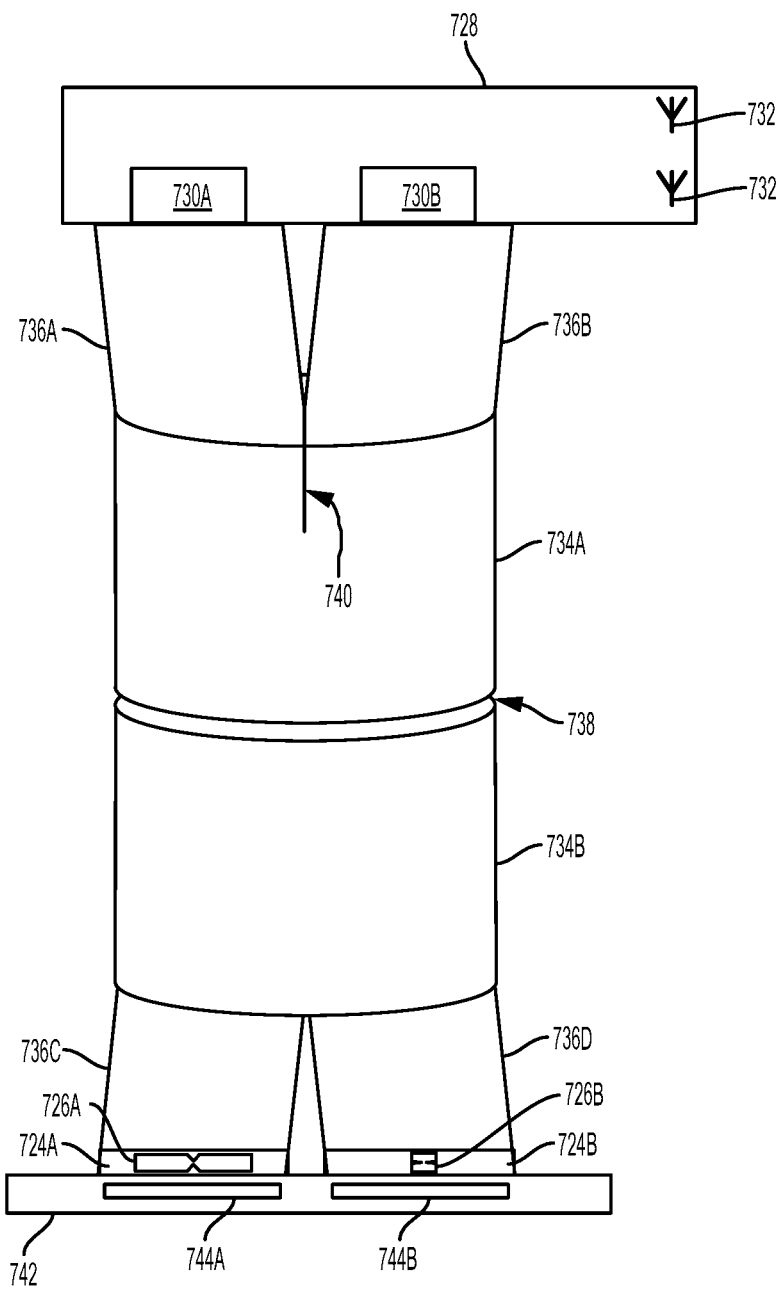
FIG. 7C illustrates another example communication system.

FIG. 7C illustrates another example communication system similar to the communication system of FIG. 7B, except, instead of having two communication chips on the vehicle-side, a single communication chip 742 having a first antenna 744A and a second antenna 744B is included. As so arranged, the communication system of FIG. 7C may operate similarly to the communication system of FIG. 7B described above (e.g., electromagnetic signals may propagate through the system, have undesired polarization filtered, etc.), except with the single communication chip 742 (such as microchip 452 of FIG. 4B) transmitting the initial electromagnetic signals via the first antenna 744A and the second antenna 744B.

Additionally, in one or both of the communication systems shown in FIG. 7B and FIG. 7C, more chips and antennas may be included as well. Each antenna may be coupled to its own respective interface waveguide. In some examples, there may be four antennas, and four interface waveguides on each side of the waveguide system. Other possible examples are possible as well.

Figure 8:
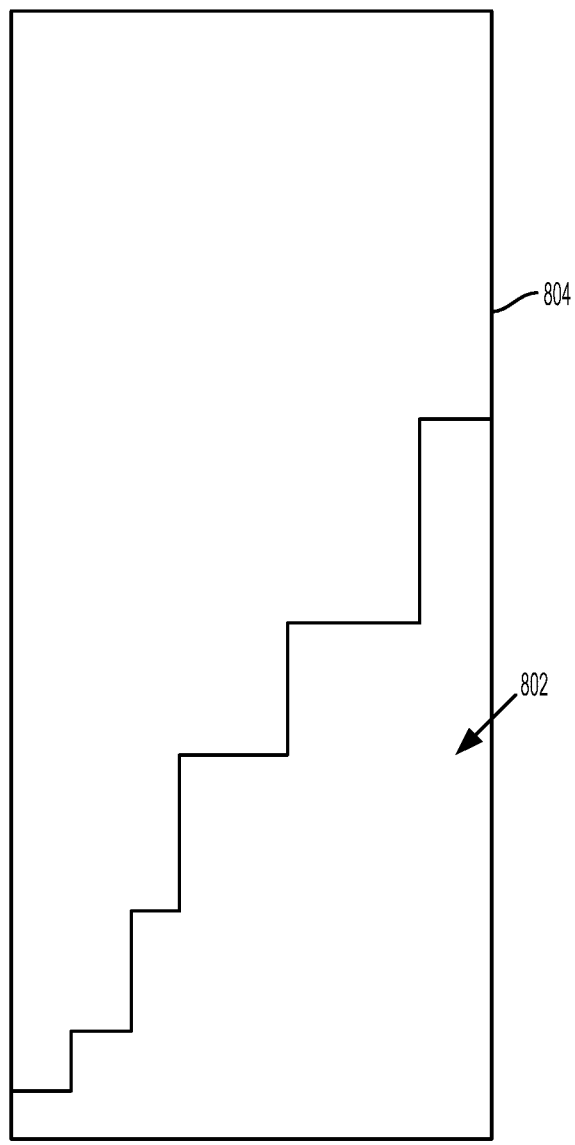
FIG. 8 illustrates an example septum of a waveguide.

FIG. 8 illustrates an example septum 802 of a waveguide 804. As shown in FIG. 8, the septum 802 may have a stepped pattern. The septum 802 may be constructed of a metallic material, a non-metallic material that has been plated with a metallic surface, a dielectric material, a combination of these materials, or other materials that may have electromagnetic properties to alter electromagnetic signals. The stepped pattern may cause an electromagnetic signal that begins propagation on one side of the septum 802 to have an orthogonal mode to a signal that begins propagation on the other side of the septum 802. Similarly, the stepped pattern may be able to split electromagnetic energy based on the modes contained in the energy. The stepped pattern may cause a portion signal that has a first mode to continue propagation on one side of the septum 802 and may cause a portion signal that has a second mode to continue propagation on the other side of the septum 802. Although septum 802 is shown having the stepped pattern, other shapes may be used as well. In some examples, or where orthogonality is not desired, the septum may be omitted.

Through the use of a septum separating the propagation modes, the vehicle side and the antenna side of a communication system may remain in communication irrespective of the rotation of the two sides. Therefore, electromagnetic signals sent by an antenna of one communication chip may be able to be received into a port of an antenna unit throughout the entire rotation.

Figure 9:
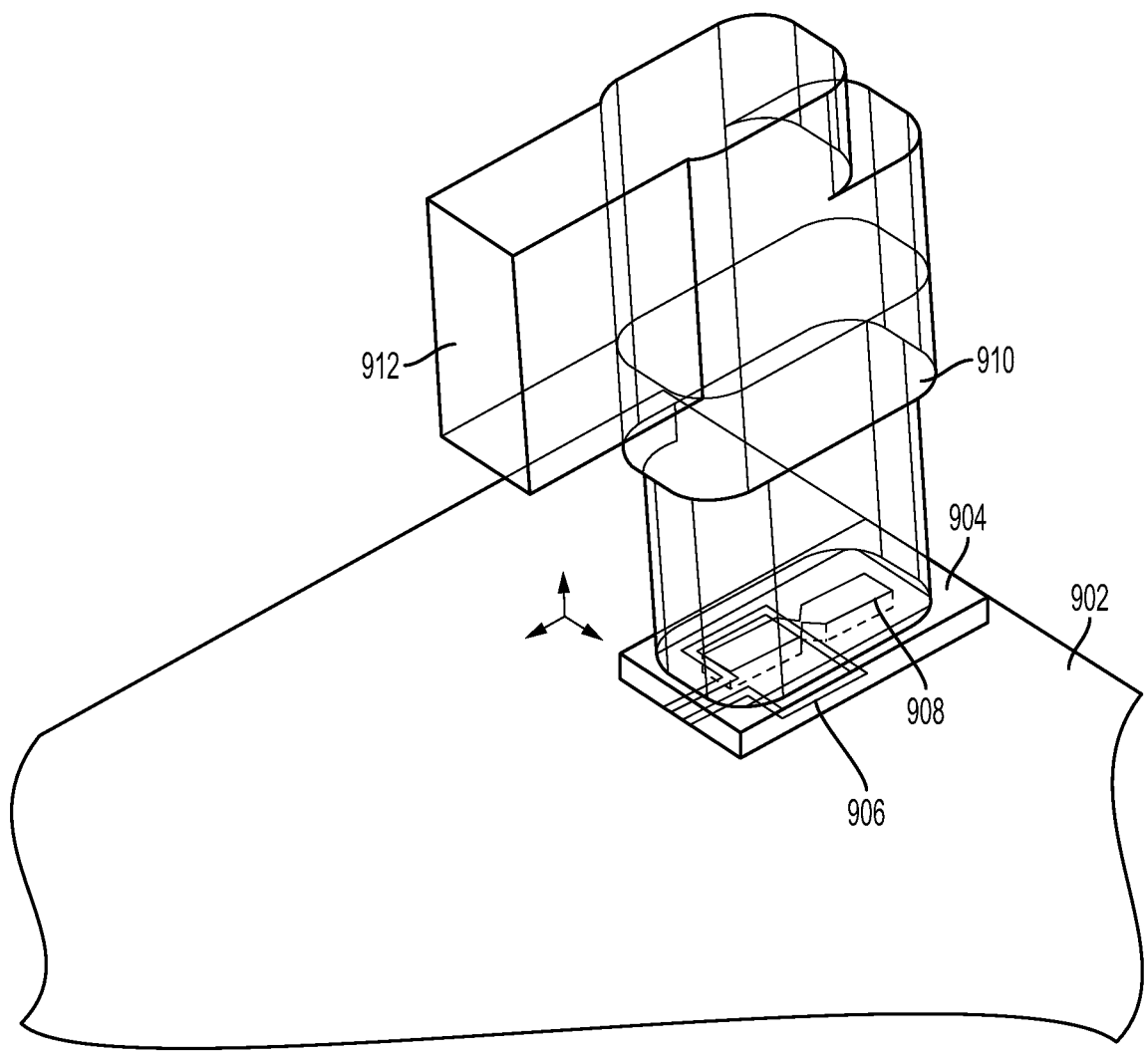
FIG. 9 illustrates another example communication system.

FIG. 9 illustrates a perspective view of another example communication system. The communication system includes (i) a printed circuit board (PCB) 902, (ii) a communication chip 904 located on the PCB 902, (iii) an antenna 906 integrated with (e.g., on, or in) the communication chip 904, (iv) a slot 908 (from a slotted structure integrated with a housing of the communication chip 904), (v) a port 910, and (vi) a portion of a waveguide 912. The portion of the waveguide 912 could be a portion of a waveguide of an antenna unit, such as antenna unit 610, 710, or 728 described above.

The port 910 may be aligned perpendicularly and out of the plane of the waveguide 912. Further, the port 910 may be shaped in a way to match (or approximately match) an impedance of the waveguide 912. For example, the port 910 may have portions that are of different dimensions to achieve the correct impedance matching.

Operation of the communication system shown in FIG. 9 may be similar to that of various communication systems described above. That is, the communication chip 904 (namely, the antenna 906) may transmit an electromagnetic signal and the slot 908 then filters an undesired polarization and couples the electromagnetic signal (now with the desired polarization) into the port 910.

Many variations on the above-described implementations are possible as well, each advantageously and reliably providing communications between the vehicle and at least one sensor. For example, in some implementations, a first and second waveguide section may couple to each other by a means other than a rotary joint. For example, the two waveguide sections may be coupled directly, thereby forming a singular intermediate waveguide. In particular, the singular waveguide may be machined from a single piece of material, or may be formed by coupling (e.g., soldering) two separate waveguide sections. In other example implementations, there may be no rotation at all, that is the two waveguides may be fixed with respect to each other. Further, the two waveguides may be a single waveguide in these examples.

Figure 10:
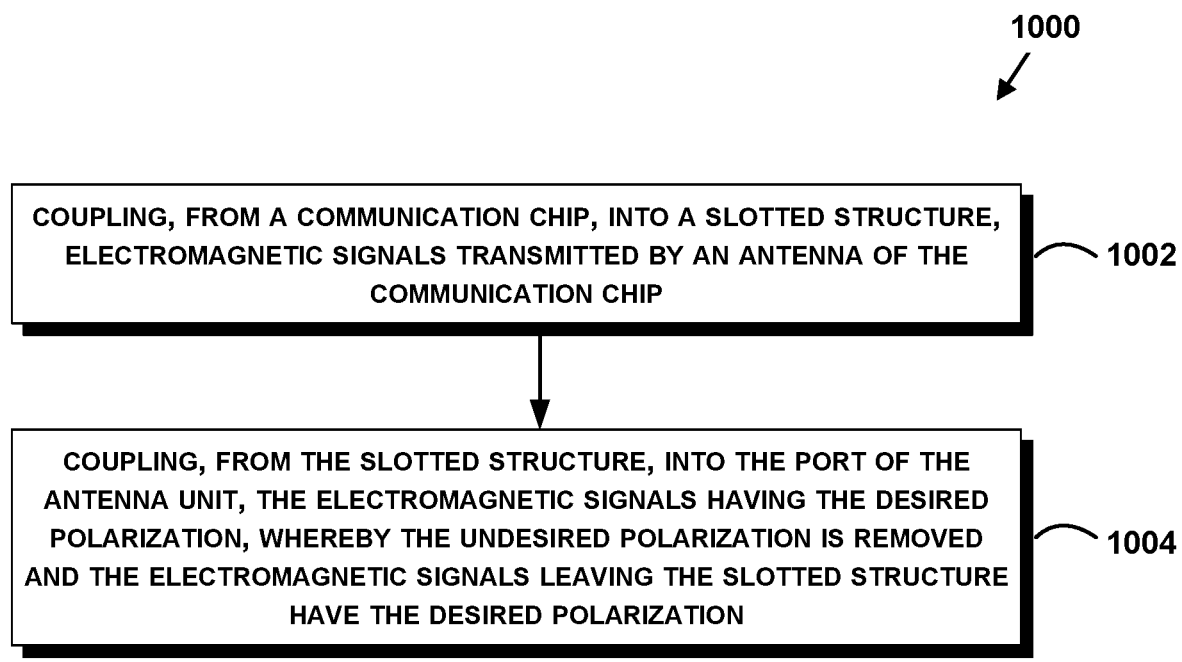
FIG. 10 illustrates an example method.

FIG. 10 illustrates an example method 1000. At block 1002, the method includes coupling, from a communication chip, into a slotted structure, electromagnetic signals transmitted by an antenna of the communication chip. The antenna may be configured to transmit the electromagnetic signals out of the communication chip and toward a port of an antenna unit. The antenna unit may be communicatively coupled to the communication chip. Further, the electromagnetic signals transmitted by the antenna may have a desired polarization and an undesired polarization, and the slotted structure may be configured to couple electromagnetic signals having the desired polarization into the antenna unit.

At block 1004, the method includes coupling, from the slotted structure, into the port of the antenna unit, the electromagnetic signals having the desired polarization, whereby the undesired polarization is removed and the electromagnetic signals leaving the slotted structure have the desired polarization.

Therefore, method 1000 enables vehicle-side components (e.g., the communication chip) to be in RF communication with antenna-side components (e.g., the antenna unit) and further enables mitigation of cross polarization using the slotted structure. Electromagnetic energy may thus be harvested from the communication chip, with undesired polarization reduced or eliminated.

In some examples, the slotted structure may be integrated with a housing of the communication chip. In other examples, the slotted structure may be physically distinct and separate component from the communication chip. For instance, the slotted structure may be coupled between the communication chip and the antenna unit, or may be coupled to the port of the antenna unit.

In some examples, the port of the antenna unit may be located on a first surface of the antenna unit, and a second surface of the antenna unit, at an opposite end of the antenna unit from the first surface, may include at least one radar-transmission antenna, such as an array of radar-transmission antennas.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A communication system comprising:
an antenna unit having a port;
a communication chip communicably coupled to the antenna unit and having an antenna configured to transmit electromagnetic signals having a desired polarization and an undesired polarization;
a waveguide communicatively coupled between the communication chip and the port; and
a slotted structure, physically separate from the waveguide, and configured for receiving the electromagnetic signals from the antenna, removing the undesired polarization from the electromagnetic signals, and coupling the electromagnetic signals having the desired polarization from the antenna into the waveguide, after which the electromagnetic signals propagate through the waveguide and into the port.

2. The communication system of claim 1, wherein the slotted structure is integrated with a housing of the communication chip.

3. The communication system of claim 1, wherein the slotted structure is a physically distinct and separate component from the communication chip.

4. The communication system of claim 3, wherein the slotted structure is coupled between the communication chip and the waveguide.

5. The communication system of claim 1, wherein:
the port of the antenna unit is located on a first surface of the antenna unit, and
a second surface of the antenna unit comprises at least one radar-transmission antenna.

6. The communication system of claim 1, wherein the waveguide comprises a waveguide chimney having a first end proximate to the communication chip and a second end opposite the first end and proximate to the port of the antenna unit,
wherein the slotted structure is located between the communication chip and the first end of the waveguide chimney.

7. A method for filtering out undesired polarizations from electromagnetic signals, the method comprising:
coupling, from a communication chip, into a slotted structure, electromagnetic signals transmitted by an antenna of the communication chip, wherein the antenna is configured to transmit the electromagnetic signals out of the communication chip and into a waveguide, toward a port of an antenna unit, wherein the antenna unit is communicatively coupled to the communication chip, wherein the electromagnetic signals transmitted by the antenna have a desired polarization and an undesired polarization, and wherein the slotted structure is configured to couple electromagnetic signals having the desired polarization into the waveguide, and wherein the slotted structure and the waveguide are physically separate structures; and
coupling, from the slotted structure, through the waveguide, and into the port of the antenna unit, the electromagnetic signals having the desired polarization, whereby the undesired polarization is removed and the electromagnetic signals leaving the slotted structure have the desired polarization.

8. The method of claim 7, wherein the slotted structure is integrated with a housing of the communication chip.

9. The method of claim 7, wherein the slotted structure is a physically distinct and separate component from the communication chip.

10. The method of claim 9, wherein the slotted structure is coupled between the communication chip and the waveguide.

11. The method of claim 7, wherein:
the port of the antenna unit is located on a first surface of the antenna unit, and
a second surface of the antenna unit comprises at least one radar-transmission antenna.

12. A communication system comprising:
an antenna unit configured to radiate radar signals, wherein the antenna unit comprises:
a plurality of transmission antennas arranged in an array,
a port configured to receive radar signals for radiation by the plurality of transmission antennas, and
a waveguide network coupling the port to the plurality of transmission antennas;
a communication chip communicably coupled to the port, wherein the communication chip is configured to radiate a radar signal having a desired polarization and an undesired polarization;
a waveguide communicatively coupled between the communication chip and the port; and
a signal-filtering slotted structure, physically separate from the waveguide, and configured to receive the radar signal from the communication chip, filter the undesired polarization from the radar signal, and couple the filtered radar signal into the waveguide, after which the electromagnetic signals propagate through the waveguide and into the port.

13. The communication system of claim 12, wherein the signal-filtering slotted structure is integrated with a housing of the communication chip.

14. The communication system of claim 12, wherein the signal-filtering slotted structure is a physically distinct and separate component from the communication chip.

15. The communication system of claim 14, wherein the signal-filtering slotted structure is coupled between the communication chip and the waveguide.

16. The communication system of claim 1, wherein:
the waveguide comprises a first section, a second section, and a rotary joint, and
the rotary joint comprises an air gap across which the electromagnetic signals propagate from the first section to the second section.

17. The communication system of claim 1, wherein a target impedance matching characteristic determines a size and shape of a slot of the slotted structure.

18. The communication system of claim 1, wherein the slotted structure comprises:
a slot configured for receiving the electromagnetic signals from the antenna and coupling the electromagnetic signals from the antenna into the waveguide; and
one or more vias located proximate to a center of the slot, wherein the one or more vias are configured to induce the slot to radiate the electromagnetic signals into the waveguide.

19. The communication system of claim 6, wherein the waveguide chimney is a dual-channel waveguide chimney.

20. The method of claim 10, further comprising:
coupling the electromagnetic signals from the slotted structure through a first section of the waveguide, across a rotary joint separating the first section from a second section of the waveguide, and into the second section,
wherein the rotary joint comprises an air gap.

* * * * *